W. R. BURROWS.
WELDING MACHINE.
APPLICATION FILED OCT. 12, 1904.

1,063,504.

Patented June 3, 1913.

Witnesses

Inventor.
William R. Burrows.
By
Atty

W. R. BURROWS.
WELDING MACHINE.
APPLICATION FILED OCT. 12, 1904.

1,063,504.

Patented June 3, 1913.

Witnesses

Inventor
William R. Burrows.
By Albert H. Davis
Atty.

W. R. BURROWS.
WELDING MACHINE.
APPLICATION FILED OCT. 12, 1904.

1,063,504.

Patented June 3, 1913.
4 SHEETS—SHEET 4.

Witnesses
J. Ellis Glen
Anthony E. Marx

Inventor:
William R. Burrows.
By Albert G. Davis
Atty.

UNITED STATES PATENT OFFICE.

WILLIAM R. BURROWS, OF NEWARK, NEW JERSEY, ASSIGNOR TO GENERAL ELECTRIC COMPANY, A CORPORATION OF NEW YORK.

WELDING-MACHINE.

1,063,504.   Specification of Letters Patent.   Patented June 3, 1913.

Application filed October 12, 1904. Serial No. 228,218.

*To all whom it may concern:*

Be it known that I, WILLIAM R. BURROWS, a citizen of the United States, residing at Newark, county of Essex, State of New Jersey, have invented certain new and useful Improvements in Welding-Machines, of which the following is a specification.

This invention relates to a machine for welding together the ends of wires, metal rods or the like.

More particularly the invention relates to a machine for measuring off a definite length of wire, heating its end so as to form thereon a globule of soft metal, then measuring off a definite length of another wire and sticking its end into the soft metal so as to firmly unite the ends of the two wires.

The machine further comprises means for cutting off the welded wires at the proper points, ejecting them from the machine, counting them, and automatically arranging the welded wires in the proper relation in boxes or other suitable receptacles.

The machine is of particular utility in the manufacture of leading-in wires for incandescent lamps. In these lamps the leading-in wires extend through the glass stems and for this reason it has been common heretofore to use platinum for the portion of the wires which is inclosed by the glass since platinum has practically the same coefficient of expansion with changes of temperature as glass and for that reason a perfect, stable seal can be made. The cost of platinum, however, precludes its use for the entire length of the leading-in wire, and it has therefore been the common practice heretofore to use for this purpose a short length of platinum wire welded, or otherwise connected, to a copper wire. The manufacture of these leading-in wires has, prior to my invention, been done by hand, and though operators quickly become expert in this work, the output per operator is small. With my machine I can manufacture as many of the leading-in wires as ten skilled operators making them by hand, and as the machine is entirely automatic one operator can readily attend to five or six of the machines at once.

The novel features which I believe to be characteristic of my invention will be definitely indicated in the claims appended hereto; the details of construction and the mode of operation of my improved welding machine will be better understood by reference to the following description taken in connection with the accompanying drawings which show one embodiment of my invention.

Figure 2:
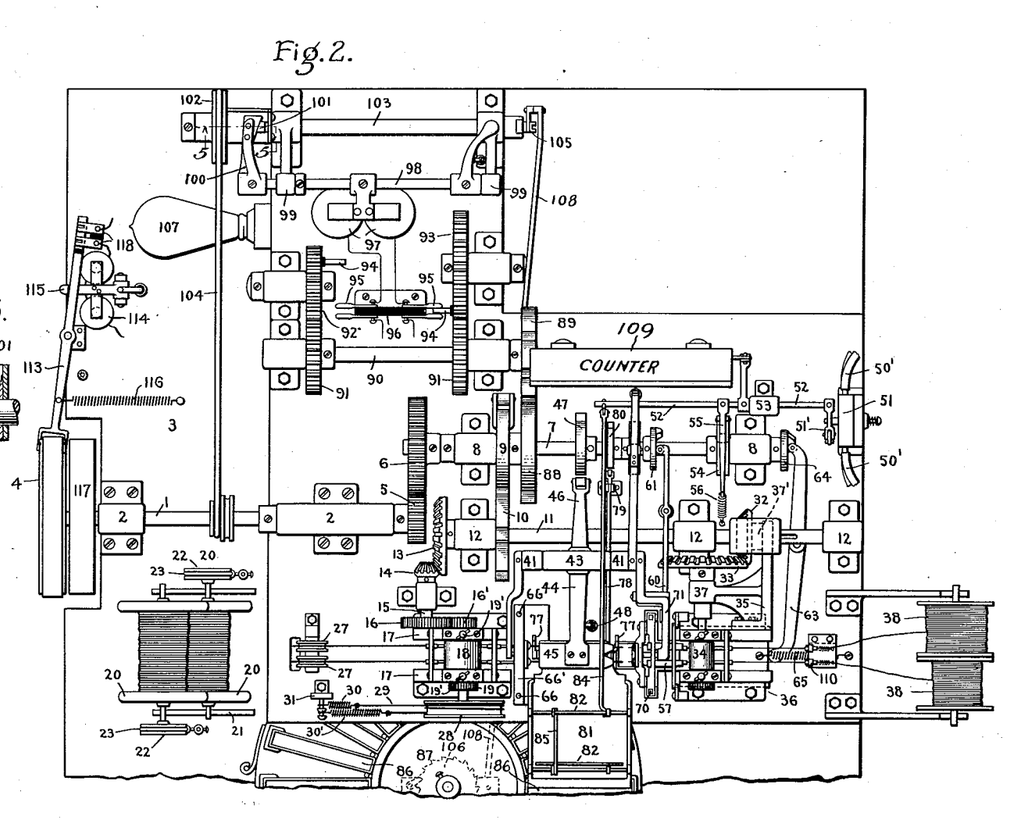
Fig. 2 is a plan view of the same broken away in part.

Referring first to Fig. 2, 1 indicates a shaft mounted for rotation in bearings 2 secured on a table 3. On one end shaft 1 carries a pulley 4 by which the shaft is rotated, and on the other a pinion 5 which meshes with a gear 6 on an operating shaft 7 mounted in bearings 8 on a raised portion of table 3. Secured on shaft 7 is a single-toothed gear 9 which meshes with a six-toothed gear 10 of the Geneva type mounted on a measuring shaft 11 which rotates in bearings 12 also mounted on table 3. Secured on the end of the shaft 11 is a bevel gear 13 meshing with a bevel pinion 14 on a cross-shaft 15; this shaft carries a gear 16 in mesh with a pinion 16' on the shaft of one of a pair of rollers 18 mounted for rotation in standards 17 secured on table 3. On the side of the rollers 18 opposite pinion 16' the shafts of the rollers carry pinions 19 which mesh together and thus cause the two rollers to rotate together to draw off the proper lengths of wire.

Figures 1, 4:
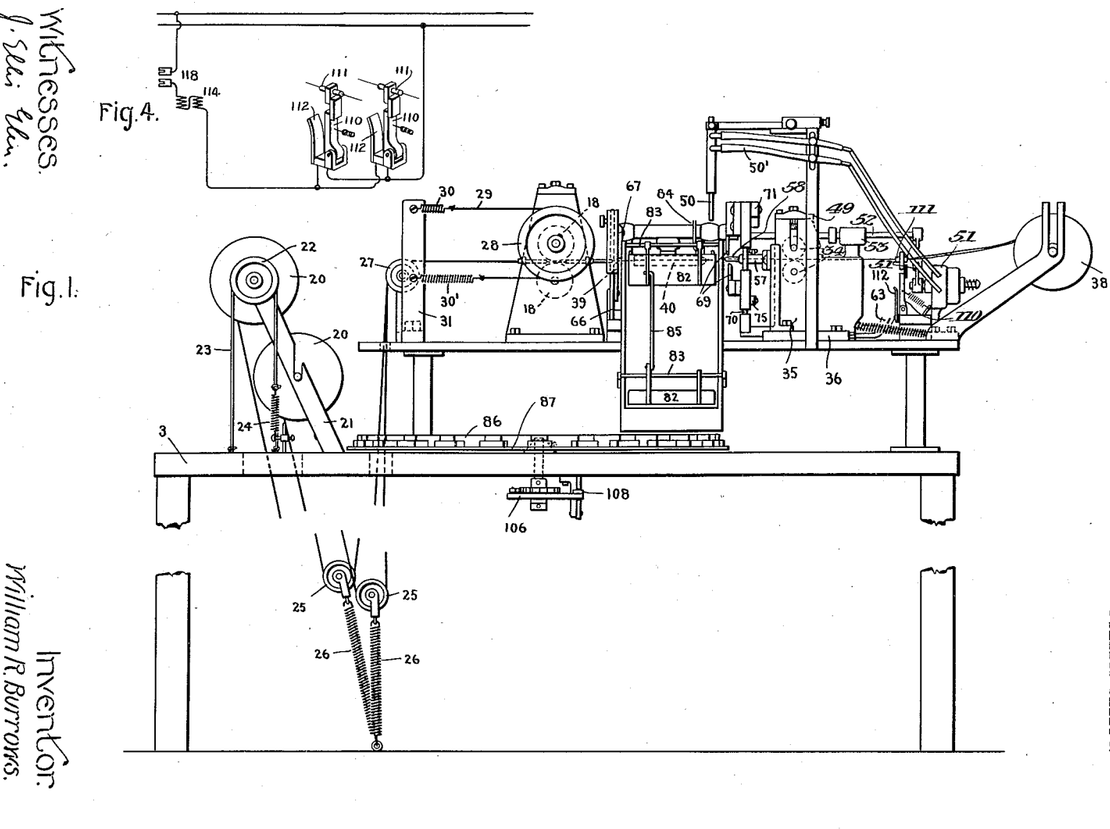
Figure 1 is an elevation of the machine.
Fig. 4 is a diagram of circuits.

The machine illustrated in the drawings is duplex in its action; that is, it is so constructed that two leading-in wires are made at the same time throughout the operation of the machine. The wires pass between the rollers 18 parallel to each other, screws 19' being provided to regulate the pressure of the rollers on the wires, and are drawn by the rotation of the rollers from two reels 20 removably mounted in brackets 21 secured on table 3. In order that the rotation of the rollers shall not jerk the wire from the reels and cause the latter to unwind more than is desired I provide braking devices for the reels and tension equalizers for the wires. On the shaft of each of the reels 20 is a pulley 22 over which extends a belt 23 secured at one end to the end of a coiled spring 24, the other ends of the belt and spring being fastened to table 3 as shown in Fig. 1. The wire from each reel passes down through an opening in the table and under a pulley 25 which is secured to one end of a coiled spring 26, the other end of which is fastened to the floor. From pulleys 25 the wires pass upward through another opening in table 3 over pulleys 27 and to the rollers 18. On the end of the shaft of the upper roller is another brake pulley 28 over which extends a belt 29 the ends of which are secured to springs 30, 30' which have their opposite ends made fast to a post 31, the lower spring 30' being stronger than the upper.

Splined on the measuring shaft 11, near the end opposite that on which gear 13 is secured, is a bevel pinion 32 meshing with a bevel gear 33 on a cross-shaft which drives a pair of rollers 34 similar to the rollers 18. Rollers 34 are mounted for rotation in uprights on a carriage or frame 35 which is slidably mounted in ways 36 on the table 3, and this frame has an arm 37, preferably integral therewith, in which is a bearing for the shaft of gear 33, and a second arm 37' from which two fingers depend one on each side of the pinion 32. By this construction the frame carrying the rollers 34 can be moved back and forth in the ways 36 but the pinion 32 slides with it on shaft 11 and is therefore at all times in mesh with gear 33 so that shaft 11 is always in driving relation to the rollers 34. Rollers 34 feed forward the two wires which are to be welded to the wires fed forward by rollers 18 and these wires are drawn from reels 38 removably mounted in suitable brackets as shown. When the machine is used for making leading-in wires, these reels carry the platinum wires and as only very short lengths of these wires are used each time, it is not absolutely necessary to provide braking devices for the reels or tension equalizers for the wires; however, I have found it desirable in some cases to employ such devices.

It will thus be seen that when the tooth on gear 9 engaged gear 10, the measuring shaft 11 was turned one-sixth of a revolution, causing the pairs of rollers 18 and 34 to rotate in their bearings and feed the two wires extending between each pair of rollers forward toward each other a definite distance; but this feeding movement is not enough to bring the ends of the oppositely-arranged wires into engagement with each other. The arrangement of the gears is such that about four inches of the copper wires is drawn from the reels 20, and about one-quarter of an inch of the platinum wires from the reels 38. When the rollers 18 begin to turn, reels 20 do not unwind immediately but instead the springs 26 are extended; when the tension of the springs overcomes the braking effect of the belts 23 on pulleys 22 the reels begin to turn and springs 24 are extended. The braking effect of the belts 23 is somewhat weakened by the turning of the reels 20 and springs 26 are thus permitted to assume their normal tension; and as soon as the rotation of the rollers 18 stops the tension of springs 24 immediately causes belts 23 to be drawn down tight on pulleys 22 to prevent further rotation of the reels. When the rollers 18 turn, spring 30' is extended and the slack in belt 29 is taken up by spring 30. Belt 29 therefore exerts a practically constant braking effect and when shaft 11 stops and is locked by the Geneva gears 9 and 10, rollers 18 stop immediately; that is, there is no back-lash or lost motion due to looseness in the gears so that exactly the same lengths of the copper wires are fed forward each time.

Figure 3:
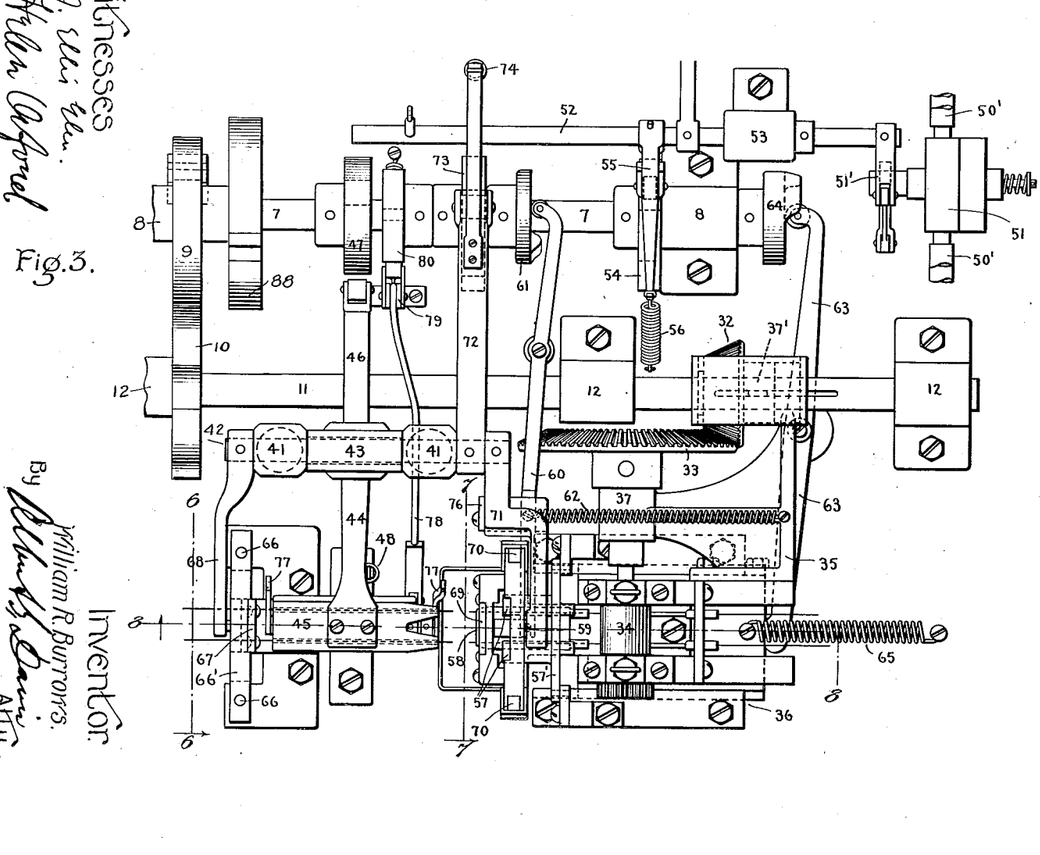
Fig. 3 is an enlarged plan view of a portion of the machine.

The rotation of rollers 18 feeds the copper wires forward over a cutting plate 39, a supporting plate 40 and out a short distance beyond the end of plate 40 as shown in the drawings. Mounted on the table are posts 41 in which are bearings for a shaft 42 and loose on this shaft between the bearings 41 is a sleeve 43. Secured to this sleeve is an arm 44 carrying at its outer end a cover-plate 45 provided with parallel longitudinal grooves as shown in dotted lines in Fig. 3 and arranged to coöperate with the supporting plate 40 to inclose and support the copper wires. The supporting plate 40 and the coöperating cover plate 45 form a stationary holder or clamping device by means of which the copper wires are clamped with their ends projecting to a definite and predetermined extent. Extending back from sleeve 43 is an arm 46 carrying a roller in its end which is engaged by a projection on a cam 47 keyed on the operating shaft 7 to depress arm 46 and thus raise cover-plate 45. A spring 48 having one end attached to arm 44 and the other fastened to the table returns the cover-plate when the roller on arm 46 is released by cam 47. The projection on this cam is so shaped and positioned that cover-plate 45 is raised somewhat before the copper wires are fed forward by rollers 18 and is released again and drawn down by spring 48 immediately after the ends of the wires have been pushed forward over plate 40, whereupon the wires are gripped or clamped between the two plates.

Mounted on the table is a standard 49 which supports two blow-pipe burners 50 arranged for adjustment in any direction so that they can be accurately positioned directly over the ends of the copper wires when the latter have been fed forward by rollers 18. These burners are supplied with gas and air by the pipes 50' in which is a valve 51. The operating shaft of this valve is linked to an arm 51' secured on a shaft 52 mounted for rocking movement in a bearing 53. The rocking of this shaft is effected by a cam keyed on shaft 7 and provided with a projection which co-acts with an arm 55 secured to shaft 52. A spring 56 having one end attached to arm 55 and the other secured to the table holds the arm down on the cam surface so that arm 55, shaft 52 and the parts secured thereto are returned to their normal position when the projection on the cam has passed from under the arm. This projection is so shaped that arm 55 is raised and held in the raised position and the supply of gas and air to the burners 50 thus cut down during about one-third of a revolution of the operating shaft 7 and is so positioned that the gas and air are turned on each time immediately after the copper wires have been fed forward to their proper positions by the rollers 18.

In front of the frame or carriage 35 slidably mounted in the ways 36 and carrying the rollers 34 and the gears 32 and 33 are grooved bars or ways 57 secured to a cross-piece 57' in which is slidably mounted a guide 58 for the platinum wires. The frame 35, provided with the feed rollers 34 and guide 58, forms a movable holder by means of which the platinum wires are carried into true end to end engagement with the copper wires. This guide has parallel openings therethrough as shown by the dotted lines in Fig. 3, through which the platinum wires are fed by the rollers 34, each partial rotation of rollers 34 being arranged to feed the wires so that their ends protrude, preferably about $\frac{1}{32}$ of an inch, beyond the edge of the guide. On top of the guide is a pin 59 and the forked end of a lever 60 pivotally mounted on the table straddles this pin. The other end of lever 60 carries a roller which engages a cam 61 secured on shaft 7. A coiled spring 62 holds the roller against the cam surface thus keeping the guide in the retracted position except when the projection on cam 61 is under the roller on lever 60. Pivotally mounted on the table is another lever 63 one end of which engages the back of the carriage or frame 35 and the other end of which carries a roller which engages a cam 64 also secured on the operating shaft 7. A coiled spring 65 having one end secured to a fixed post and the other end to a post on the carriage 35 holds the carriage in the backward position except when pressed forward by lever 63.

The cams 61 and 64 are so positioned that the projections thereon come under the levers 60 and 63, respectively, at the same time so that carriage 35 and guide 58 move forward together and this movement is of such length that the ends of the two platinum wires are stuck into the ends of the copper wires which have been reduced to a plastic state by the flames from the burners 50. The guide 58 supports the platinum wires up to points very close to their ends and thus prevents kinks in the wires or the natural bend after being coiled on the reels from directing their ends away from the ends of the copper wires and thus forming imperfect leading-in wires. In order, however, that the platinum wires may be cut at the proper points this guide must be retracted from between the blades 69 while the carriage 35 is in the forward position, and this is accomplished by making the projection on cam 61 very short. The lever 60 is thus retracted by spring 62, carrying with it the guide 58 which slides in the ways 57, immediately after the weld is made.

Mounted to slide vertically on rods 66 secured on the table 3 is a cross-bar 66' carrying a knife-blade 67 which is operated to cut the copper wires, the wires being supported for this purpose by the stationary cutting plate 39. To effect this, blade 67 is provided with a pin which fits into an opening, oval-shaped to permit a slight lateral movement of the pin therein, in an arm 68 secured on shaft 42. To cut the platinum wires, no stationary cutting plate is provided directly under them similar to the plate 39 under the copper wires as the guide 58 has to be pushed forward beyond the line of cutting to properly direct the ends of the platinum wires. Instead of a single blade and a stationary support, I therefore employ for this purpose two movable blades 69 which are mounted to slide vertically on the rods 70 secured to the carriage 35. The upper blade 69 has an opening therein and an arm 71 secured to shaft 42 carries a pin on its forward end which extends through the opening in blade 69 and has a little lateral play therein. A lever 72 is also secured to shaft 42 and extends backward therefrom over a cam 73 on shaft 7, the arm being held in engagement with the cam by a coiled spring 74 secured at one end to the arm and at the other to the table. By this construction arm 72 is raised by a projection on cam 73 thus rocking shaft 42 in its bearings 41 and depressing the free ends of arms 68 and 71 which carry the blade 67 and the upper blade 69 respectively. In order to operate the lower blade 69 a lever 75 is pivotally mounted on the table and provided with an oval-shaped opening in its end through which passes a pin on the blade, and a link 76 is pivotally connected to the arm 71 and extends down therefrom to the rear end of link 75 to which it is also pivotally connected. Thus when the free end of arm 71 is depressed, link 76 depresses the rear end of lever 75, raising its front end and the lower blade 69 carried thereby. The two blades 69 meet at the line along which the platinum wires pass and cut the wires between them, and it will be seen that the connections between the operating arms 71 and 75 and the pins on the two blades permit the latter to move back and forth with carriage 35.

Mounted in suitable bearings below the supporting plate 40 is a shaft on the ends of which are the ejector arms 77 which extend upwardly therefrom on either side of the supporting plate 40. A rod 78 is pivotally connected to a crank on this shaft and extends backward therefrom and a link 79, suitably mounted on the table and pivotally connected to the rod supports it in proper relation. A cam 80 secured on shaft 7 coöperates with a roller on rod 78, a spring being provided to hold the roller against the cam, to turn the arms 77 on their pivot and thus cause them to sweep the two welded leading-in wires from the supporting plate 40 immediately after the wires have been cut, cam 47 being so positioned on shaft 7 that the cover-plate 45 is raised just before the arms 77 are moved by cam 80.

Immediately in front of the supporting plate 40 is a chute 81 into which the wires are pushed by the arms 77. This chute is provided with two gates 82 which are alternately opened and closed so that the wires are caught twice in passing through the chute to insure their falling into a receptacle at the mouth of the chute in the proper relation. These gates 82 are swung on rods 83 extending across the chute and are operated by a rod 84 pivotally connected at one end to an arm on the shaft 52 and at the other end to the upper gate. A rod 85 is pivotally connected at one end to the gate 82 below the rod 83 on which it swings, and at the other end to an extension of one of the supports of the lower gate 82 above the rod 83 on which it swings. Thus as shaft 52 is rocked in its bearing 53 as heretofore explained, the rod 84 is reciprocated axially and opens and closes the upper gate 82, and by means of rod 85 this closes and opens the lower gate. The two finished wires ejected by the arms 77 each time they are operated are thus caught by the upper gate and rest momentarily against it; and when this gate is opened the wires fall until caught again by the lower gate. Arresting the wires in this way while they are passing through the chute insures their being arranged side by side directly across the chute. When the lower gate is opened the two wires fall into a box 86 which is directly beneath the mouth of the chute.

Figure 5:
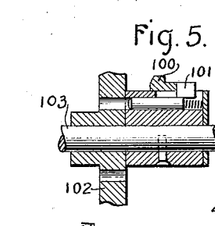
Fig. 5 is a sectional view along the line 5—5 of Fig. 2.
Figure 6:
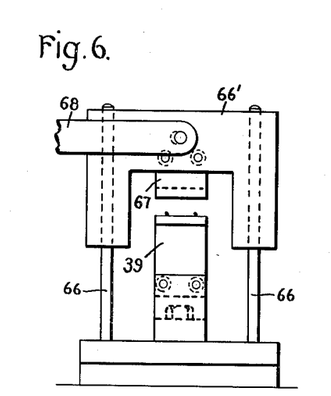
Fig. 6 is a cross section just in front of the shears for the copper wire along the line 6—6 of Fig. 3.
Figure 7:
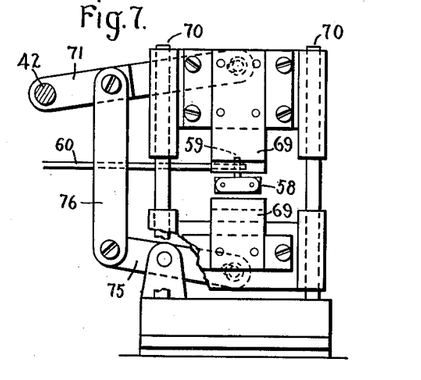
Fig. 7 is a cross-section just in front of the shears for the platinum wire along the line 7—7 of Fig. 3.
Figure 8:
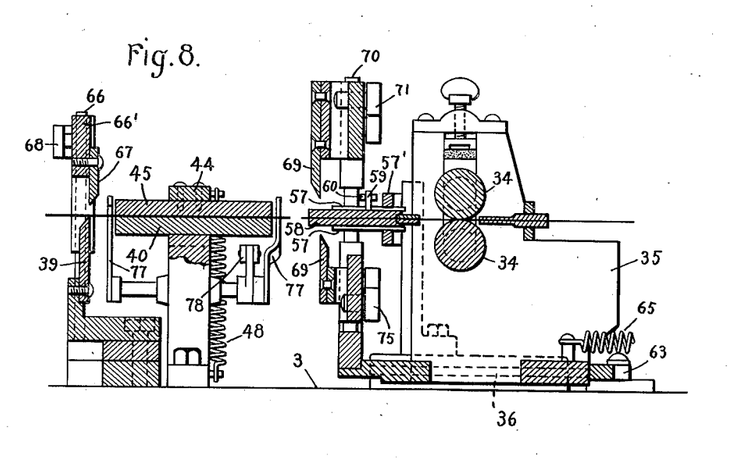
Fig. 8 is a longitudinal section along the line 8—8 of Fig. 3 parallel to the two wires which are to be welded.

I prefer to provide a plurality of these boxes 86 arranged radially on a circular plate 87 pivotally mounted on the lower portion of the table 3, and to provide means for automatically withdrawing each box after a definite number of the welded wires have been dropped therein and substitute an empty box in its place. To accomplish this I provide on shaft 7 a single-toothed gear 88 meshing with an eight-toothed gear 89 on a shaft 90 which carries two gears 91, each having sixteen teeth. As two leading-in wires are made each time shaft 7 completes one revolution, and as shaft 90 makes one-eighth of a revolution for each full revolution of shaft 7, each of the sixteen teeth on the gear 91 represent one leading-in wire. It would be possible to provide means operated from shaft 90 for shifting the circular plate 87 and the boxes carried thereby after a definite number of leading-in wires have been made, but if a large number of wires were to be placed in each box the ordinary devices employed for this purpose would require a series of reduction gears. I have therefore provided a simple means for accomplishing this same result. I mount on the table 3 two gear wheels meshing with the two gears 91, the numbers of teeth on the two wheels being different and the least common multiple of these two numbers being the number of wires it is desired to place in each of the boxes on the plate 87. Thus if four hundred wires are to be packed in each box, gear 92 could have sixteen teeth and gear 93 twenty-five teeth. On each of the gears 92 and 93 is an insulated metallic pin 94 each of which is arranged to cross-connect a pair of contacts 95 mounted on a wall of insulating material 96. When the two pins 94 are cross-connecting the two pairs of contacts 95 circuit is closed from any suitable source through the coils of a magnet 97, which by attracting its armature rocks a shaft 98 in bearings 99 and thus raises an arm 100 to release the head 101 of a pin. This pin is carried by a hub secured on a shaft 103 and when released is pressed by a spring to connect a pulley 102, loose on a shaft 103 and driven by a belt 104 from the driving shaft 1, in driving relation to shaft 103. As the pins 94 leave the contacts 95 immediately, the circuit is immediately opened again permitting arm 100 to be drawn down by a suitable spring into the position shown in Fig. 5, where its inclined edge engages the head of the pin 101, and thus withdraws the pin from clutching relation to pulley 102 as the rotation of the pulley carries the head 101 of the pin along the inclined edge of arm 100. Shaft 103 is thus caused to make one complete revolution each time circuit through solenoid 97 is closed, and a crank 105 on this shaft operates to turn the box-carrying plate 87 through the intermediacy of a bell-crank lever, a rod 108, and the ratchet and pawl mechanism 106 shown in Fig. 1. Thus the box which has been filled with four hundred of the finished leading-in wires is moved away from the mouth of chute 81 and an empty box is substituted in its place. In addition to this mechanism a summation counter 109 of ordinary construction for indicating the total number of welds may be provided and operated by an arm secured to the shaft 52 in the usual manner.

The operation of the machine will be understood from the foregoing description.

One cycle of operations, including the manufacture of two leading-in wires, is completed for each revolution of the operating shaft 7. During about two-thirds of the revolution the blow-pipe flames are playing on the ends of the copper wires to reduce them to a plastic state; during the remaining one-third the following operations take place in the order named; the flames are cut down and the platinum wires pushed forward to make the weld, the guide is withdrawn, the cutters operated, the carriage 35 withdrawn, the cover-plate raised, the ejectors operated, the feeding devices operated, the cover-plate lowered over the copper wires and the flames turned on again. The best results are not obtained immediately after starting as some of the parts of the machine must be warmed up to make perfect leading-in wires. With the cover-plate 45 held in the raised position by cam 47, the single tooth on gear 9 engages gear 10 thus rotating the measuring shaft 11 one-sixth of a revolution and, through the intermediate gearing, rollers 18 and 34 are rotated to feed the copper and platinum wires forward toward each other. The braking devices and tension equalizers heretofore explained prevent the reels 20 from being unwound too much and prevent lost motion in the gears which would cause an inaccurate feed of the copper wires. The forward feed of the oppositely-arranged wires is not, however, sufficient to bring their respective ends into contact. The cover-plate 45 is released by cam 47 and drawn down by spring 48 to inclose the copper wires as soon as they have been pushed forward over plate 40 and at almost the same time cam 54 raises arm 55 and thus rocks shaft 52 to open valve 51 and admit gas and air to the burners 50. These burners direct a hot blast directly onto the ends of the copper wires and reduce them to a plastic state. This relation of the parts continues for about $\frac{2}{3}$ of a revolution of the operating shaft 7, at the end of which period a globule of soft copper is formed on the ends of the copper wires and valve 51 is again operated to cut down the blow-pipe flames. Levers 60 and 63 are operated by cams 61 and 64 respectively, to push the carriage 35, the guide 58 and all the parts carried thereby forward in the ways 36 and this movement sticks the ends of the platinum wires into the globules of soft copper. The guide 58 through which the platinum wires extend only about $\frac{1}{32}$ of an inch guides them and insures a perfect joint between the two wires. The guide 58 is then immediately retracted by spring 62, cam 61 being shaped to permit this movement. The purpose of withdrawing guide 58 is to remove it from between the cutting blades for the platinum wires and also to have it out of the range of the blow-pipe burners when they are again turned on as otherwise the guide would soon be spoiled by the intense heat. Cam 73 then raises arm 72 thus depressing arms 68 and 71 and the cutting blades carried thereby and raising the forward end of arm 75 and the lower blade 69 to cut the several wires at the proper points. Cam 64 permits spring 65 to draw the carriage 35 and parts carried thereby back in the ways 36. Cam 47 then raises cover-plate 45 and cam 80 pushes rod 78 forward to turn the ejector arms 77 on their pivot. Arms 77 engage the completed leading-in wires and sweep them off the supporting plate 40, the wires falling into the chute 81. Immediately thereafter, the measuring shaft 11 is again rotated to feed forward the wires for another pair of leading-in wires and another cycle of operations is begun. The two finished wires are caught by the upper gate 82 which is then held in the closed position by the rod 84. When shaft 52 is again rocked the upper gate is opened and the lower gate closed by rod 85 and the two wires fall to the bottom of the chute where they are again caught by the lower gate and against which they lie side by side across the chute. When the upper gate is again closed the lower is opened and the two wires drop into the box 86 under the end of the chute, and as this drop is very small the wires always fall in proper position lengthwise of the box. Since the shaft 90 is turned $\frac{1}{8}$ of a revolution for each complete revolution of the operating shaft 7, and since two leading-in wires are made each time shaft 7 revolves, gears 91, each of which has 16 teeth, are rotated one tooth for each leading-in wire that is made. The gears 92 and 93 have 16 and 25 teeth respectively, so that every time 400 leading-in wires have been made the contacts 94 cross-connect the two pairs of stationary contacts 95, and this closes circuit through magnet 97 as heretofore explained, and also through the indicator lamp 107 to show that a definite number of welds has been made. This permits shaft 103 to make one revolution and thus moves the box which has been filled with 400 finished leading-in wires away from the end of chute 81 and substitutes an empty box in its place. It will thus be seen that the operation of the machine is continuous and automatic; that the wires are fed by the rollers from continuous lengths carried by suitable reels, their ends are welded together and the wires cut at predetermined points so that all are of the same size; and further that the finished leading-in wires are automatically ejected and packed evenly in boxes and that when a definite number have been packed in a box it is moved aside and its place taken by an empty one.

The machine can be operated very rapidly; in practice I have found that I can easily make 50,000 of the leading-in wires a day with one machine and as it is automatic throughout a single operator can attend to five or more machines at once.

I have found it desirable to guard against the entrance of a knot or kink in either of the platinum wires into the guide 58, and for this purpose have provided a knot-detector arranged to stop the machine before a knot in either wire can reach the guide. This detector consists of two pivoted spring-retracted arms 110 mounted, as shown, on the table 3 and each carrying a member 111, preferably of glass or porcelain, having a hole therethrough for the platinum wire which is larger than the wire but not large enough to permit the passage through it of a knot or kink in the wire. When, in the operation of the machine, a knot or kink reaches either member 111 it draws it forward, turning the arm 110 on its pivot against the tension of its retracting spring, until a contact on the arm engages a spring contact 112 and closes an electric circuit as shown in Fig. 4. The closure of this circuit may be arranged to stop the operation of the machine in any suitable manner. In the drawing I have shown fast and loose pulleys on the drive shaft 1 and a pivoted lever 113 arranged to guide the belt by which the machine is driven. When the arm 110 engages spring contact 112, circuit is closed through the coils of two magnets 114 which, being energized, attract an armature. A pivoted latch 115 which normally holds the lever 113 in position to hold the driving belt on the fast pulley 4 is secured to the armature of the magnets 114 and hence, when the magnets are energized, the latch releases lever 113 and a spring 116 pulls the lever to the position in which it guides the driving belt onto the loose pulley 117. The circuit of the magnets 114 may be completed through two contacts 118 and an insulated extension of lever 113 so that when lever 113 is released and turned on its pivot to stop the operation of the machine the circuit of magnets 114 is automatically opened.

I wish it understood that throughout this specification I use the term "weld" in its broader sense, meaning uniting two or more articles by the application of heat thereto. I also use the word "wire" in a broad sense, including therein round, ribbon-section and stranded wires and metallic rods of larger cross-section than those commonly termed "wires".

I do not wish to be understood as limited to the precise construction which I have illustrated and described herein except as defined in the appended claims as many modifications can be made therein both when the machine is used for making leading-in wires and in adapting it for other uses.

What I claim as new and desire to secure by Letters Patent of the United States, is,—

1. In a wire welding machine, the combination of a feed mechanism for feeding a wire, a heater mounted adjacent the path of said wire and in a position to render the end of said wire plastic, a regulator for varying the effect of said heater on the wire, a second feeding mechanism for feeding wire to bring its end into engagement with the end of the wire fed by the first feeding mechanism, and common operating means for actuating said first feeding mechanism to feed the wire, then actuating said regulator to reduce the effect of said heater, and finally actuating said second feeding mechanism while the end of the wire fed by said first feeding mechanism is still plastic.

2. In a wire welding machine, the combination of feeding mechanism for feeding a wire, a burner mounted to direct its flame against said wire, a regulator for varying the effect of said flame on said wire, a second feeding mechanism for feeding a second wire into contact with the first, and common operating means arranged to actuate the first feeding mechanism and regulator and the second feeding mechanism in sequence.

3. In a wire welding machine, the combination of two adjacent feeding mechanisms for feeding wires into engagement with each other at a point between said mechanisms, a burner mounted between said mechanisms to raise one of said wires to welding temperature at said point, a valve for raising and lowering the flame from the burner, a driving shaft, and connections from the shaft to said feeding mechanisms and said valve for actuating one feeding mechanism, lowering the flame and actuating the other feeding mechanism in sequence.

4. In a wire welding machine, the combination of a heater, a feeding mechanism adapted to be actuated to advance the end of a wire into the heater to soften the end of the wire, a second feeding mechanism for feeding a second wire into the softened end of the first mentioned wire, a regulator for varying the effect of the heater on said first mentioned wire, and common operating means for actuating said feeding mechanism and said regulator.

5. In a wire welding machine, the combination with a burner, of feeding mechanism arranged to advance a wire into the flame of the burner and then bring another wire and said first mentioned wire together to effect a weld between them, a regulator arranged to raise and to lower the flame of the burner when actuated, and common operating means for actuating said feeding mechanism and said regulator in definite time relation to each other to cause the flame of the burner to be raised while said first mentioned wire is in the flame and to be lowered before the two wires are brought together.

6. In a wire welding machine, the combination with feeding mechanism for bringing the ends of wires into contact, and means for welding the ends of the wire to each other, of cutting mechanism mounted adjacent the path of the wires to cut the wires on each side of the weld, and driving means for actuating said mechanisms in predetermined time relation.

7. In a wire welding machine, the combination with a heater for raising wire to welding temperature, of feeding mechanism arranged to bring into the heater the end of a continuous length of wire and to bring together said end and another end of a continuous length of wire to effect a weld, a cutter mounted on each side of the heater to cut the wires on each side of the weld, and common actuating means for operating the feeding mechanism and the cutters in succession.

8. In a wire welding machine, the combination with a heater, of feeding mechanism arranged to bring a wire into the heater and into contact with another wire to effect a weld, a cutter adjacent the path of the wires on each side of the weld, an ejector movable between the cutters to eject the welded wires, and common operating means for actuating the feeding mechanism, the cutters and the ejector in sequence.

9. In a wire welding machine, the combination with a guide and feeding rolls for moving one wire through the guide until the end projects from said guide, of a holder for gripping the other wire with its end projecting from the holder, said guide and said holder being mounted for relative movement in alinement with each other and longitudinally of said wires, and operating means for moving the guide and holder toward each other to bring the ends of the wires into engagement.

10. In a wire welding machine, the combination with a clamping device for holding one wire with its end projecting therefrom, of a movably mounted carriage, a wire feeding mechanism mounted on said carriage and arranged to hold the other wire with its end projecting therefrom, said carriage being mounted to move toward said clamping device to bring said wires into end to end engagement, and common operating means for actuating said feeding mechanism and for moving said carriage relatively to said clamping device.

11. In a wire welding machine, the combination with a stationary holder for supporting one wire with the end projecting beyond the holder, of a movable holder mounted to reciprocate in alinement with the stationary holder, feeding mechanisms for feeding wires into both of said holders, and common operating means for actuating said feeding mechanisms and for moving said movable holder toward the other in sequence.

12. In a wire welding machine, the combination with a clamping device for holding one wire, of a carriage mounted to reciprocate in alinement with said clamping device, a guide mounted on said carriage, a feeding mechanism mounted on said carriage adjacent the guide for feeding a wire into the guide, and common operating means for actuating the feeding mechanism and reciprocating the carriage.

13. In a wire welding machine, the combination with a heater, of a holder for supporting one wire with its end in the heater, feeding mechanism for feeding the other wire longitudinally and in alinement with the first wire to bring it into end to end engagement with the wire in said holder to effect a weld, and a guide for supporting said other wire with its end projecting into position to engage the end of the first wire.

14. In a wire welding machine, the combination with a holder for supporting one wire, of a feeding mechanism mounted to move toward said holder to feed the other wire into contact with the wire in said holder to effect a weld, a movable guide for supporting the end of said other wire mounted to move relatively to said feeding mechanism, and common operating means for moving said feeding mechanism and said guide in timed relation to each other.

15. In a wire welding machine, the combination with a holder for supporting one wire, of a feeding mechanism comprising a member movable toward the holder to bring the other wire into contact with the wire in said holder to effect a weld, a guide for supporting the end of said other wire movably mounted on said member, a cutter mounted on said member adjacent the path of the wire to cut the wire fed by said feeding mechanism, and driving means for actuating said member, said guide and said cutter in sequence.

16. In a wire welding machine, the combination with a holder for supporting one wire, of a carriage mounted to reciprocate relatively to said holder to feed the other wire into contact with the wire in said holder to effect a weld, a movable guide for supporting the end of said other wire slidably mounted on said carriage, actuating means for moving said carriage and said guide in timed relation to each other, cutting blades mounted on and movable with said feeding device for cutting the wire fed thereby, and operative connections between said blades and said actuating means for operating said blades, said carriage and said guide in sequence.

17. In a wire welding machine, the combination with a reciprocating feeding mechanism for feeding the wires into contact to effect a weld, of cutting blades mounted on and movable with said feeding mechanism to cut the wire fed thereby, a movable guide for the end of said wire mounted to reciprocate between said blades, and common operating means for moving said feeding mechanism reciprocating said guide and actuating said cutting blades in sequence.

18. In a wire welding machine, the combination with a holder for the wire consisting of a base and a movable cover plate coöperating therewith, of an ejector adjacent the holder and arranged to engage the wire when actuated, actuating means for said ejector, and connections for said actuating means to lift the cover plate when the ejector is operated.

19. In a wire welding machine, the combination with a heater, of a holder for supporting one wire with its end projecting from said holder into position to be softened by the heater, a support for a reel of wire, a feeding device between the heater and the reel for feeding the wire from the reel a predetermined distance toward said holder and in alinement with the wire in said holder to bring the ends of said wires into engagement with each other and thereby weld them to each other, a cutter mounted between the feeding mechanism and the heater adjacent the path of the wire to cut the wire at a predetermined distance from the weld, and common operating means for actuating said feeding mechanism and said cutter in sequence.

20. A wire welding machine having supports for reels of wire on opposite sides thereof, a heater between said supports, a feeding mechanism between the reels adapted to feed forward the wire from one reel into the heater when actuated, a second feeding mechanism adapted to advance the end of the other wire into contact with the heated end of the first wire when actuated, cutters mounted on each side of the heater to cut the wires on each side of the weld at predetermined points, and common operating means for intermittently actuating said feed mechanisms and said cutters in definite order.

21. In a wire welding machine, the combination with coöperating cutting blades and feed mechanism for moving a wire between said blades, of a guide for the wire mounted to move in and out between said blades, and actuating means for operating said guide and said blades in sequence.

22. In a wire welding machine, the combination with a carriage mounted to reciprocate and a guide for the wire mounted on the carriage to reciprocate independently thereof, of feed rolls mounted on the carriage to feed the wire in alinement with the guide, an operating shaft parallel to the axis of movement of said carriage, and connections from said operating shaft for actuating said carriage, said guide and said feed rolls in sequence.

23. In a wire welding machine, the combination with a carriage mounted to reciprocate, cutting blades mounted transverse to the axis of reciprocation of said carriage, of feed rolls mounted on said carriage to feed wire between said blades, an operating shaft mounted parallel to the axis of reciprocation of said carriage, cams on said operating shaft to actuate the carriage and blades, a countershaft mounted parallel to the axis of reciprocation of said carriage, driving connections between said shafts, and a gear wheel splined on said countershaft and geared to said feed rolls.

24. In a wire welding machine, the combination with a movable carriage, of feed rolls for the wire mounted on said carriage, and common operating means for moving said carriage and actuating said feed rolls in definite relation.

In witness whereof, I have hereunto set my hand this tenth day of October, 1904.

WILLIAM R. BURROWS.

Witnesses:
CHARLES R. COOK,
PETER BANTA.